United States Patent Office 2,851,258
Patented Sept. 9, 1958

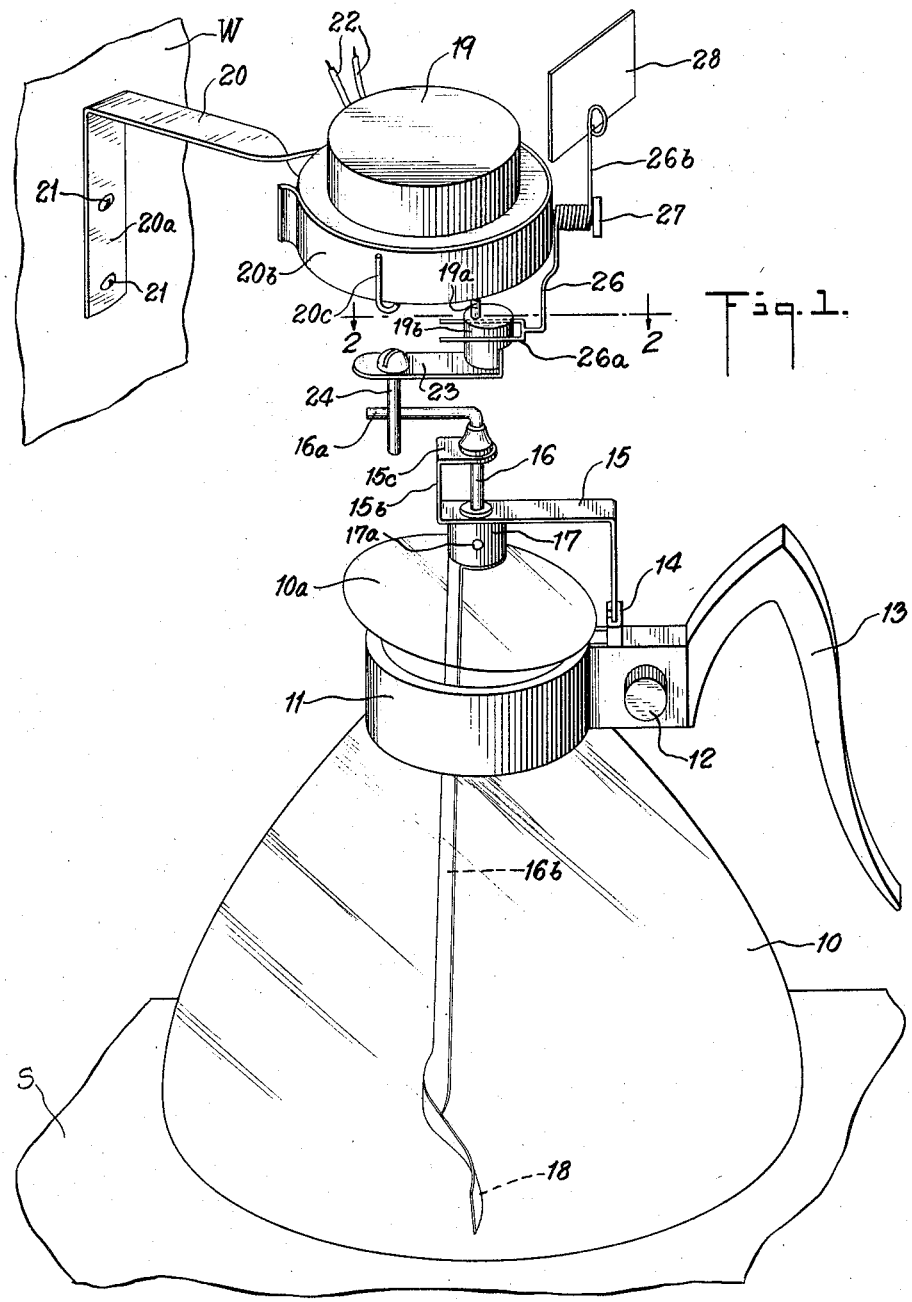

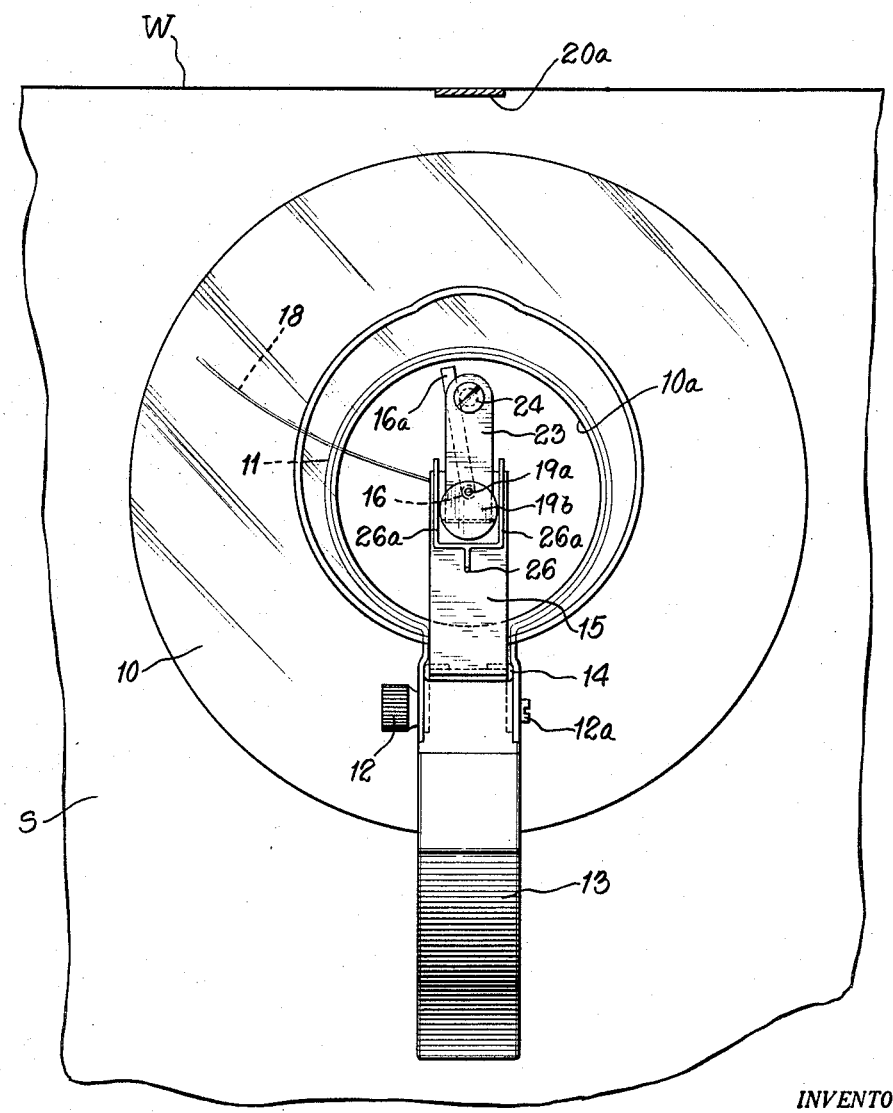

2,851,258
DEVICE FOR STIRRING AND DISPENSING LIQUIDS

Arthur E. Siehrs, Chicago, Ill., assignor to Krim-Ko Corporation, Chicago, Ill., a corporation of Illinois Application March 25, 1955, Serial No. 496,799

3 Claims. (Cl. 259—108)

This invention relates to devices for stirring and dispensing liquids, especially beverages such as a hot chocolate. It has particular reference to an improved device of this character in which the liquid dispenser or container can be readily removed from a stirring site to interrupt the agitation and permit pouring of liquid from the container, and then returned to the stirring site so that the agitation of liquid in the container is automatically resumed.

Hot chocolate drinks are frequently served in restaurants, drug stores, etc., from decanters which are kept on a stove or other heating device so that the beverage is ready for serving at the proper temperature. It is well known that these beverages require substantially constant stirring while thus heated, in order to maintain them in their most palatable condition without scorching any of the ingredients. Accordingly, the decanter is commonly provided with an agitator in the form of a blade immersed in the liquid and adapted to be oscillated by an electric motor mounted on a bracket attached to the neck of the decanter. The motor drives an eccentric or cam which operates a pendulum pivoted on the motor casing and extending downward through the top opening of the decanter, the agitator blade being secured to the lower end of the pendulum.

The prior devices described above have been found to be not entirely satisfactory. The agitation provided by the pendulum action does not entirely prevent scorching of the chocolate or milk on the heated surfaces of the decanter. Moreover, to serve the beverage from the decanter at places remote from the stove, it is necessary either to unplug the motor from the electrical outlet and transport it with the decanter and the other parts of the agitator, or to remove the motor-agitator unit from the decanter. Both of these procedures are awkward and otherwise objectionable.

The present invention has for its principal object the provision of a device which overcomes the above-noted disadvantages of the prior devices and yet is of simple construction.

A device made according to the invention comprises a decanter for receiving the liquid to be dispensed and having the usual neck provided with a top opening. A bracket secured to the decanter has a part overlying this top opening and on which a shaft is rotatably mounted. One end of the shaft is connected through the top opening to a stirring element in the decanter, so that the element is adapted to agitate the liquid in the decanter upon the rotation of the shaft. The stirring element is preferably a blade rotated by the shaft and so dimensioned that one end of the blade is moved in closely adjacent relation to the decanter along the entire periphery thereof while the bottom of the blade is in close proximity to the bottom of the decanter, whereby a thorough stirring is provided along those surfaces on which scorching is most likely to occur during heating of the liquid in the decanter. The other end of the shaft projects from the bracket and has a laterally extending arm adapted to be driven by a motor mounted on a second bracket. Means are provided for mounting this second bracket independently of the decanter and with the motor shaft substantially in alignment with and opposing the first shaft on the decanter bracket. An arm secured to the motor shaft extends laterally therefrom and has a projecting pin engageable at its free end portion with the laterally extending arm on the other shaft.

With this arrangement, the stirring element is adapted to be driven from the motor when the decanter is placed on the stove with the shaft on the decanter bracket in substantial alignment with the motor shaft. More particularly, when the decanter is thus located and the motor energized, the projecting pin on the arm of the motor shaft will engage and drive the lateral arm on the shaft supported by the decanter bracket and which is connected to the stirring element. When the decanter is removed from the stove to serve the hot beverage, the driving connection between the motor and the stirring element is automatically broken by disengagement of the arm of the shaft on the decanter bracket from the projecting pin on the arm of the motor shaft. The liquid in the decanter can then be readily served, since the stirring element and its supporting bracket do not interfere with pouring of the liquid from the decanter in the usual manner. Upon replacement of the decanter in the proper location on the stove, the stirring action is automatically resumed through re-engagement of the projecting pin on the arm of the motor shaft with the arm of the shaft on the decanter bracket.

In the preferred construction, the shaft on the decanter bracket is arranged vertically and has an adjustable connection with the stirring element to permit the latter to be located in close proximity to the bottom of the decanter, and the supporting bracket for this shaft is removably mounted on a handle of the decanter to permit removal of the bracket and stirring element for cleaning purposes. Also, the second bracket has a motor support located above the level of the arm of the shaft on the decanter bracket, and the drive shaft of the motor depends from the latter so that the lower portion of the pin on the arm of the motor shaft is at the level of the arm of the shaft on the decanter bracket. The motor support of the second bracket may be in the form of a spring loop adapted to receive and hold the motor. Preferably, a display member is pivotally mounted on this loop and has a yoke forming spaced legs which straddle an eccentric on the depending drive shaft of the motor, whereby the display device is oscillated by the eccentric when the motor is energized.

For a better understanding of the invention, reference may be had to the accompanying drawings, in which Fig. 1 is a perspective view of a preferred form of the new device, and Fig. 2 is a sectional view on the line 2—2 in Fig. 1.

Referring to the drawings, the decanter 10 is shown as being of the Cory type which is made of "Flame-Tested" glass, the decanter having the usual neck provided with a top opening 10a through which the liquid is filled into and poured from the decanter. The liquid, which may be hot chocolate, is maintained at the desired serving temperature by means of a stove S or other heating device on which the decanter rests during the intervals between servings.

A flexible metal band 11 extends around the neck of the decanter 10, and one end of the band is secured by a screw 12 to one face of a handle 13. The other end of the band 11 is secured to the opposite face of the handle by a screw 12a (Fig. 2). A holder 14 for a bracket 15 is secured between the opposed ends of the neck band 11. This holder forms a socket for the lower end of the bracket 15. The latter has at its upper portion a horizontal part extending over the top opening 10a of the decanter, and an upwardly extending part 15b terminating in a horizontal raised part 15c overlying and parallel to the main horizontal portion of the bracket. A vertical shaft 16 is suitably journalled on the bracket in the raised portion 15c and the underlying main horizontal portion. Below the latter portion of bracket 15, the shaft 16 carries a collar 17 which is releasably secured to the shaft by a set screw 17a. A metal strip 16b is brazed or otherwise secured to the collar 17 and extends downward therefrom through the top opening 10a into the decanter. The lower portion of the strip 16b is bent to form a laterally extending blade or stirring element 18, the lower edge of which is closely adjacent the bottom of the decanter, the length of blade 18 being dimensioned so that its free end is close to the side wall of the decanter.

It will be understood that the shank 16b of the blade 18 forms in effect an extension of the vertical shaft 16, so that the blade is rotated about the axis of this shaft when it is driven. Thus, the free end of the blade will move close to the outer periphery of the decanter near the bottom thereof throughout each revolution of the shaft 16. By loosening the set screw 17a of the adjustable member 17, the blade 18 may be adjusted relative to the bracket 15 so that the lower edge of the blade is only slightly above the bottom of the decanter.

The shaft 16 is adapted to be driven from an electric motor 19 mounted on a second bracket 20. This bracket is provided with means such as screws 21 for mounting a vertical leg 20a of the bracket independently of the decanter on a wall W adjacent the stove S. The bracket 20 has a motor support 20b located above the level of the top of shaft 16. As shown, the horizontal part of bracket 20 is made of spring metal which is bent to form a spring loop for receiving the motor 19, so that this loop constitutes the motor support of the bracket. The motor housing has a cylindrical part which makes a tight fit in the spring loop 20b, the latter being expansible to receive the motor housing and clamp it by the inherent spring action of the loop. To limit the downward movement of the motor in the spring loop 20b, the latter is provided with diametrically opposed fingers, one of which is shown at 20c, extending under the motor housing. These fingers may be provided with up-turned portions (not shown) received in recesses in the motor housing to prevent rotation of the housing relative to its supporting loop. The motor 19 has the usual lead wires 22 for connection to an electrical outlet (not shown) for energizing the motor.

The motor 19 has a depending drive shaft 19a which is driven from the motor through suitable reduction gearing (not shown) in the lower or enlarged portion of the motor housing. An eccentric 19b is secured to the drive shaft 19a of the motor. Below the eccentric, a laterally extending arm 23 is secured to the drive shaft 19a, it being understood that the eccentric and the arm 23 rotate with this shaft. At its outer or free end, the arm 23 is provided with a downwardly projecting pin 24, the lower portion of which is adapted to engage a laterally extending arm 16a on the upper end of the shaft 16. Thus, when the decanter 10 is placed under the motor 19 with the shafts 16 and 19a in substantial alignment, the depending pin 24 will engage the laterally extending arm 16a and drive the shaft 16 and stirrer 18 as long as the motor is energized.

The eccentric 19b on the motor shaft is straddled by two legs 26a forming a yoke at the lower end of a wire 26 coiled around a horizontal pin 27 on the motor support 20b of the fixed bracket. The wire 26 has an extension 26b projecting upward from the pivot pin 27 and supporting a display member 28, such as a panel bearing an advertisement of the particular beverage. When the motor 19 is energized, the eccentric 19b is rotated with the arm 23 on the motor shaft, with the result that the display member 28 is oscillated about the pivot pin 27 by the legs 26a straddling the eccentric.

It will be apparent that with the motor 19 energized and the decanter 10 positioned as shown in Fig. 1, the stirring element 18 will be rotated slowly about the axis of the vertical shaft 16 through engagement of pin 24 with the arm 16a. Accordingly, the beverage in the decanter will be agitated continuously while it is being maintained at the proper serving temperature on the stove S. By virtue of the close proximity of the blade 18 to the bottom and the lower side wall of the decanter, rotation of shaft 16 by the motor will effectively prevent scorching of any of the ingredients of the beverage on the hottest surfaces of the decanter, that is, on those surfaces where scorching is most likely to occur. Since the position of the stirring blade 18 is fixed relative to the bracket 15 on the decanter, the stirring action is not affected by the fact that the decanter may not always be placed with the shaft 16 in accurate alignment with the motor shaft 19a, as would be the case if the stirring element were supported from the same bracket 20 which supports the motor. In other words, if the shaft 16 is somewhat misaligned with respect to the motor shaft 19a, the depending pin 24 will slide toward and away from the free end of the lateral arm 16a of shaft 16 while driving this shaft; but the stirring action of the blade 18 will be the same as if the two shafts 16 and 19a were in exact vertical alignment.

When it is desired to serve the beverage, the decanter is removed from the stove by means of the handle 13 and the beverage is poured from the decanter in the usual manner through the top opening 10a. In thus removing the decanter, the driving connection between the motor and the stirring element 18 is automatically broken by disengagement of arm 16a from the pin 24. Although the bracket 15 and the parts supported by it will remain on the decanter, they will not interfere with the pouring of the beverage, as there is ample clearance between the spout portion of the top opening 10a and the bracket 15. Also, the parts supported by the bracket 15 are far enough removed from the spout to prevent interference with the pouring operation. By replacing the decanter on the stove under the motor 19, the stirring operation is automatically resumed through reengagement of the depending pin 24 with the arm 16a on shaft 16.

To clean the device, the bracket 15 is lifted from its socket 14 secured to the neck band 11. The stirring blade 18 may then be removed from the decanter.

It will be apparent that the pin 24 extends from one of said arms 16a and 23 and is engageable at its end portion with the other arm to rotate the shaft 16 and drive the stirring element 18.

I claim:

1. A device for stirring and dispensing a liquid, which comprises a decanter for receiving the liquid and having a neck provided with a top opening, a handle secured to the neck and projecting from one side thereof, a bracket releasably secured to the handle and having a part overlying said top opening and spaced therefrom, a first shaft rotatably mounted on said bracket part and having one end projecting from the bracket, a stirring element in the decanter supported by the bracket and to which the other end of the first shaft is connected through said top opening, said element being adapted to stir the liquid in the decanter upon rotation of said first shaft, an arm on said projecting end of the first shaft and extending laterally therefrom, a second bracket having a motor support, a motor mounted on said support and having a drive shaft, means for mounting said second bracket independently of the decanter and with said motor shaft substantially in alignment with and opposing said first shaft, an arm secured to the motor shaft and extending laterally therefrom, and a pin extending from one of said arms and engageable at its end portion with the other arm to rotate said first shaft and drive the stirring element.

2. A device according to claim 1, in which the second bracket includes a spring loop for receiving the motor and clamping the same.

3. A device for stirring and dispensing a liquid, which comprises a decanter for receiving the liquid and having a neck provided with a top opening, a handle secured to the neck, a bracket secured to the handle and having a horizontal part overlying said top opening and also having a reversely bent part generally parallel to said first part, a generally vertical first shaft rotatably mounted on said bracket parts, a stirring element in the decanter supported by the bracket and to which the lower end of the first shaft is connected through said top opening, said element being adapted to stir the liquid in the decanter upon rotation of the first shaft, an arm on the upper end of the first shaft and projecting laterally therefrom, a second bracket having a motor support, means for mounting the second bracket independently of the decanter and with its motor support above the level of said arm, a motor mounted on said support and having a depending drive shaft in substantial alignment with said first shaft, an arm secured to the motor shaft and extending laterally therefrom, a pin extending from one of said arms and engageable with the other arm to rotate said first shaft and drive the stirring element, and an adjustable member connecting the stirring element to said first shaft to permit changing the position of the stirring element relative to the decanter and independently of said arms.

References Cited in the file of this patent

UNITED STATES PATENTS

| | | |
|---|---|---|
| 668,686 | Marshall | Feb. 26, 1901 |
| 797,742 | McCord | Aug. 22, 1905 |
| 1,370,752 | Long | Mar. 8, 1921 |
| 1,370,768 | Sperling | Mar. 8, 1921 |
| 1,681,076 | Wohl | Aug. 14, 1929 |
| 1,735,143 | Supervielle | Nov. 12, 1929 |
| 1,826,948 | Nelson | Oct. 13, 1931 |
| 2,610,424 | Millard | Sept. 16, 1952 |
| 2,707,622 | Vance | May 3, 1955 |